Nov. 3, 1953  P. MARTIN  2,657,513
CORN HARVESTER AND ENSILAGE CUTTER
Filed July 28, 1948  9 Sheets-Sheet 1
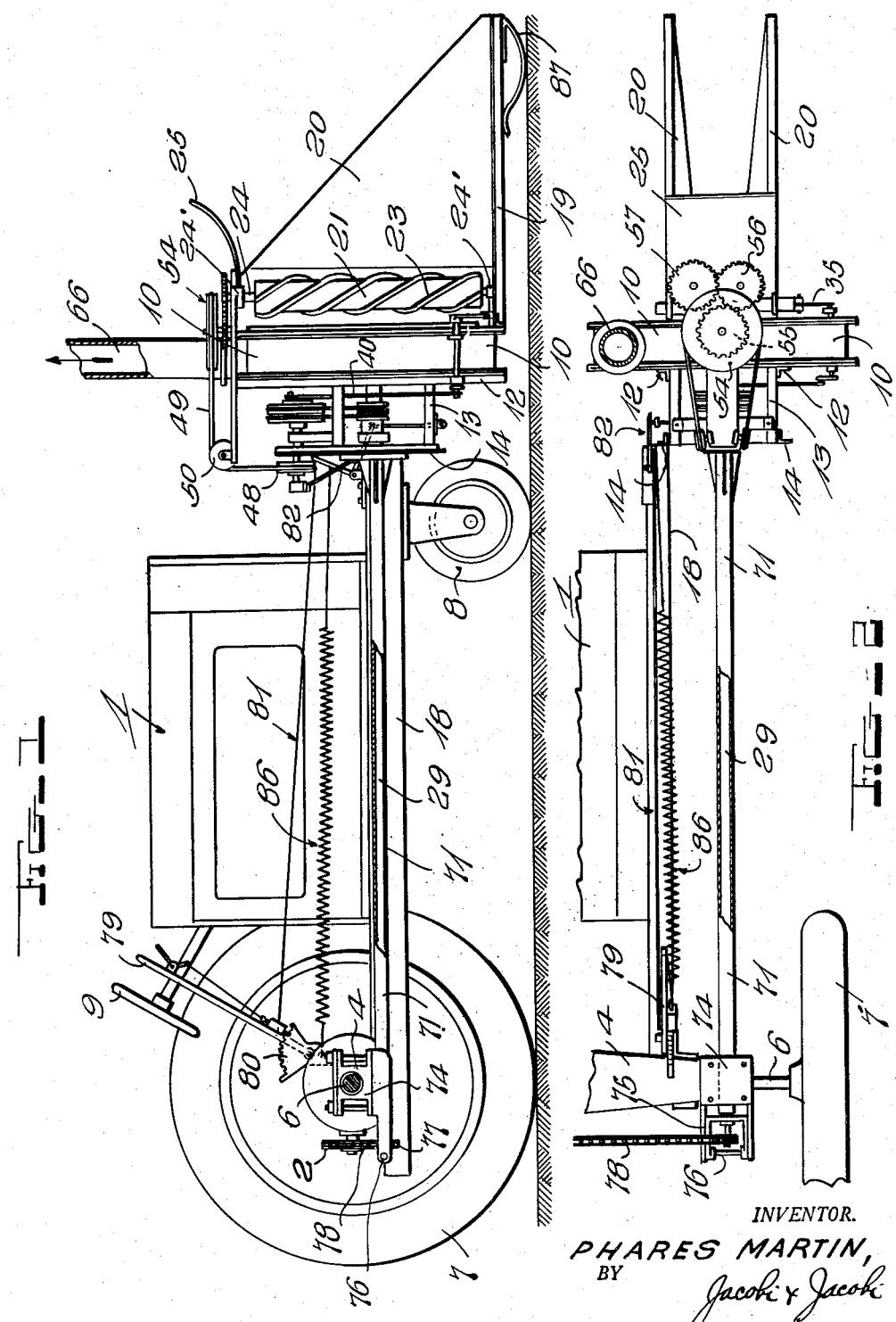
INVENTOR.
PHARES MARTIN,
BY
Jacobi & Jacobi
ATTORNEYS Nov. 3, 1953 P. MARTIN 2,657,513
CORN HARVESTER AND ENSILAGE CUTTER
Filed July 28, 1948 9 Sheets-Sheet 2
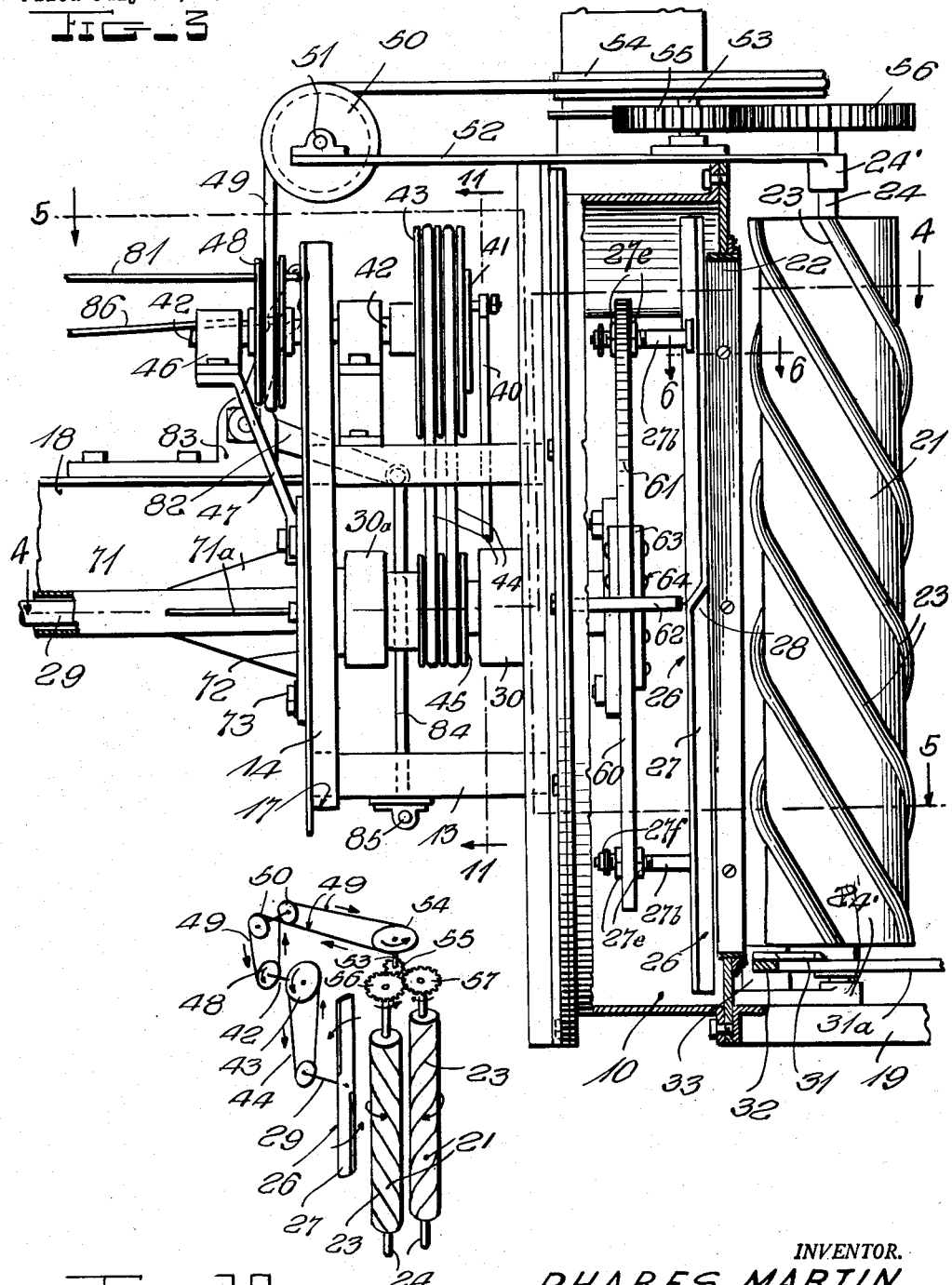
INVENTOR.
PHARES MARTIN,
BY
Jacobi & Jacobi
ATTORNEYS Nov. 3, 1953     P. MARTIN     2,657,513
CORN HARVESTER AND ENSILAGE CUTTER
Filed July 28, 1948     9 Sheets-Sheet 3
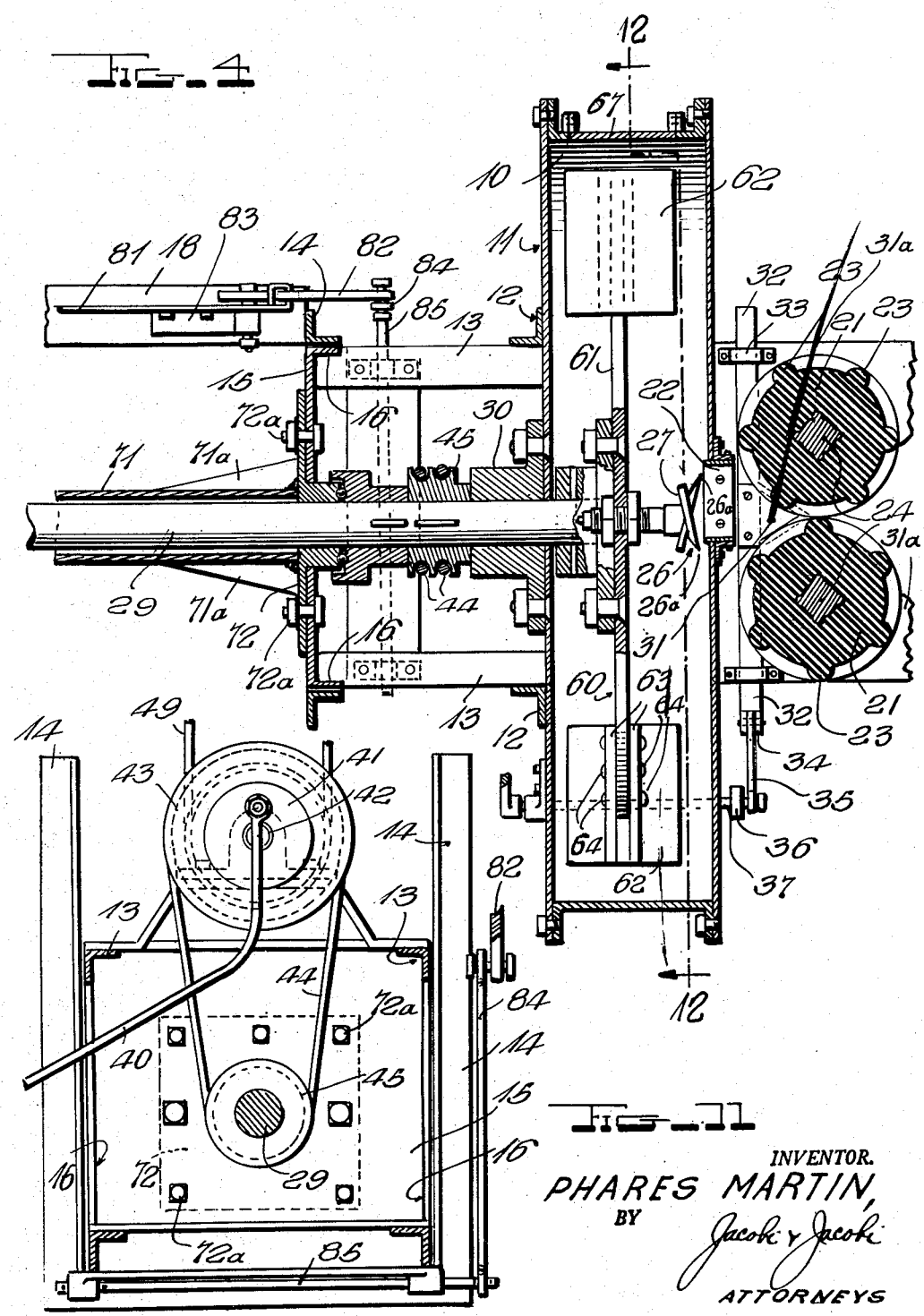
INVENTOR.
PHARES MARTIN,
BY Jacob y Jacob
ATTORNEYS

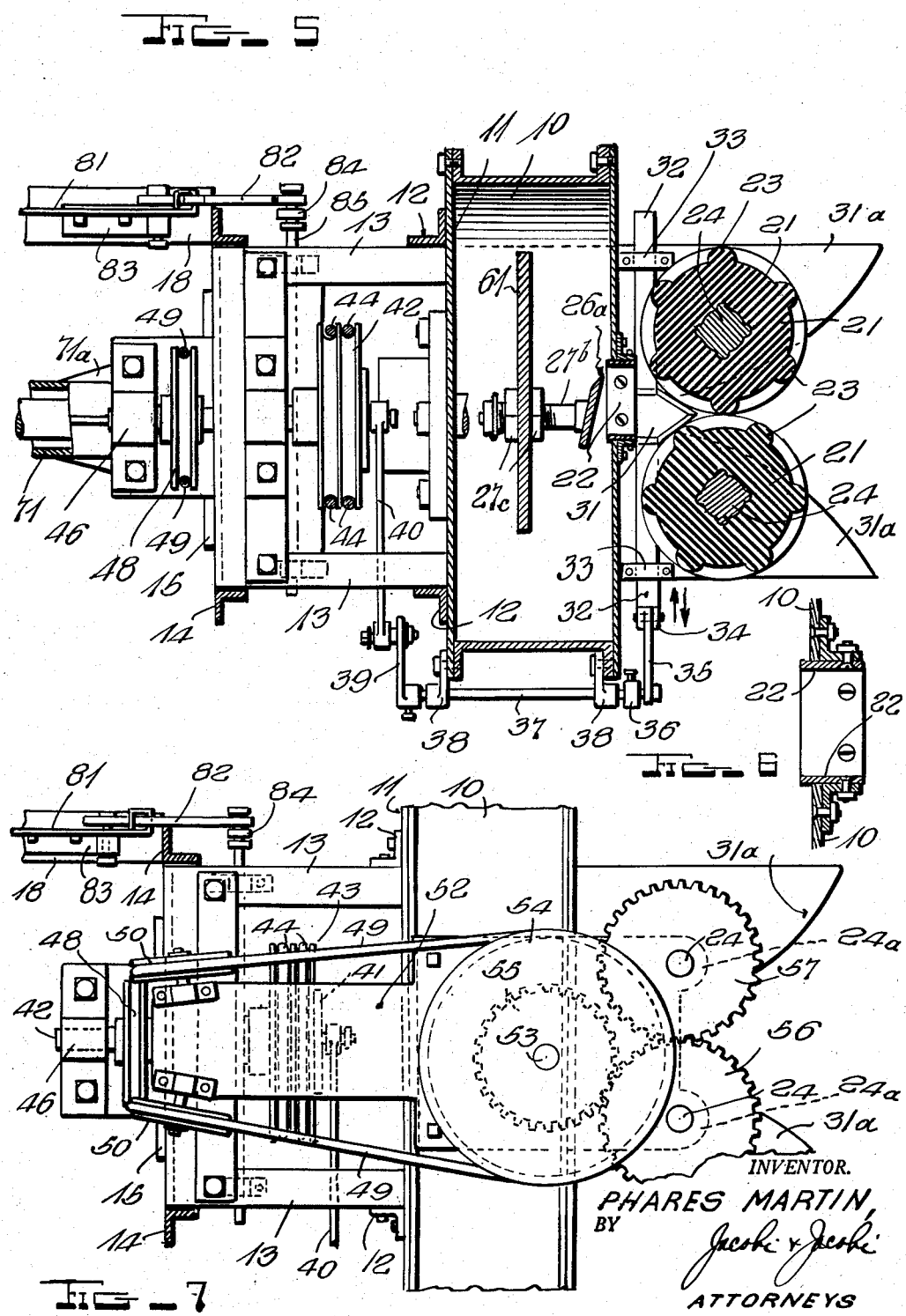

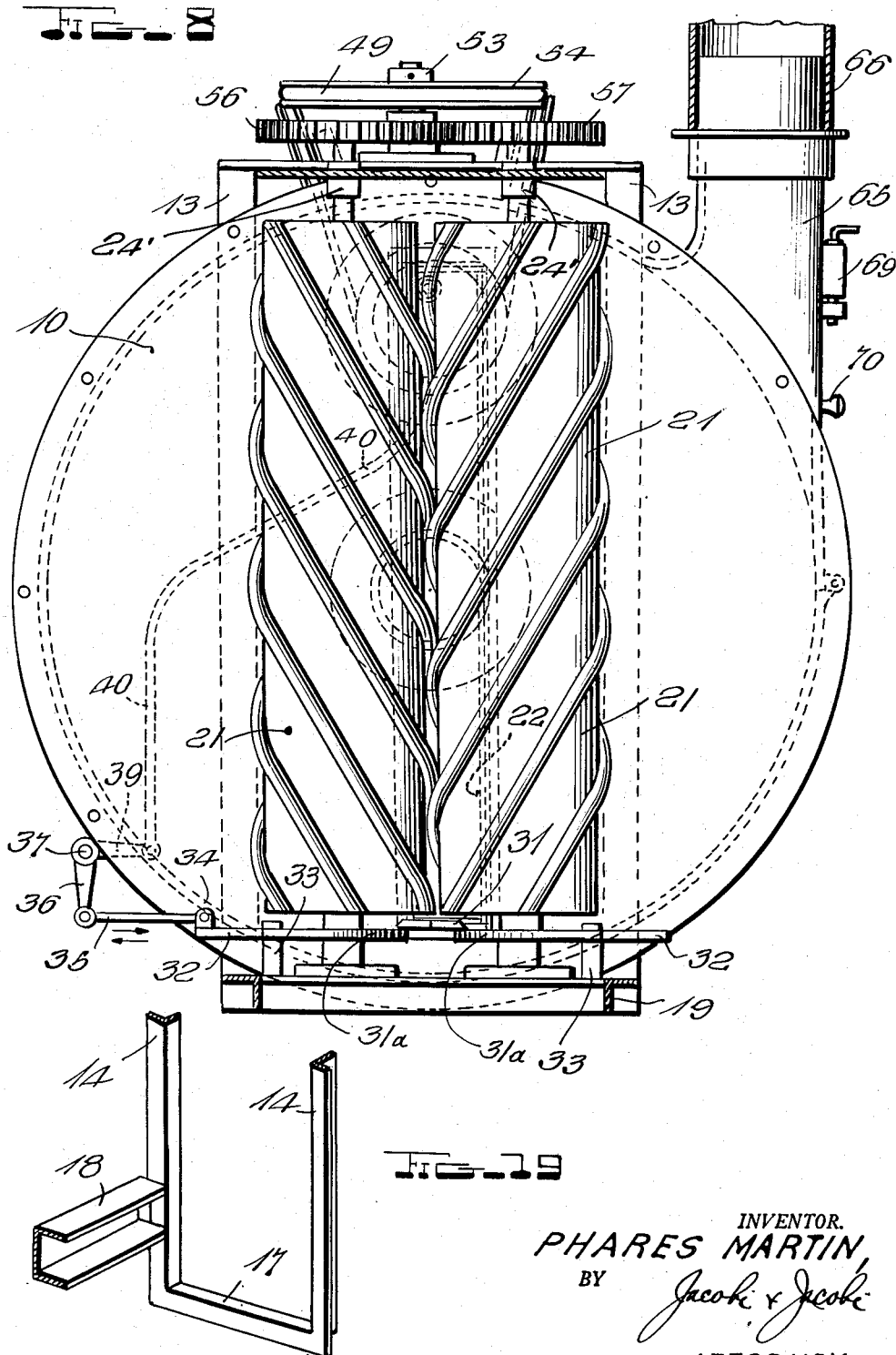

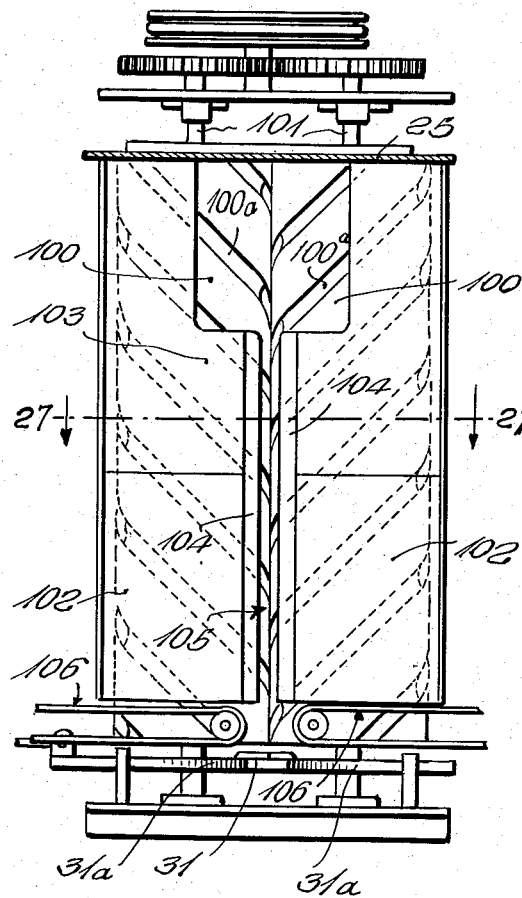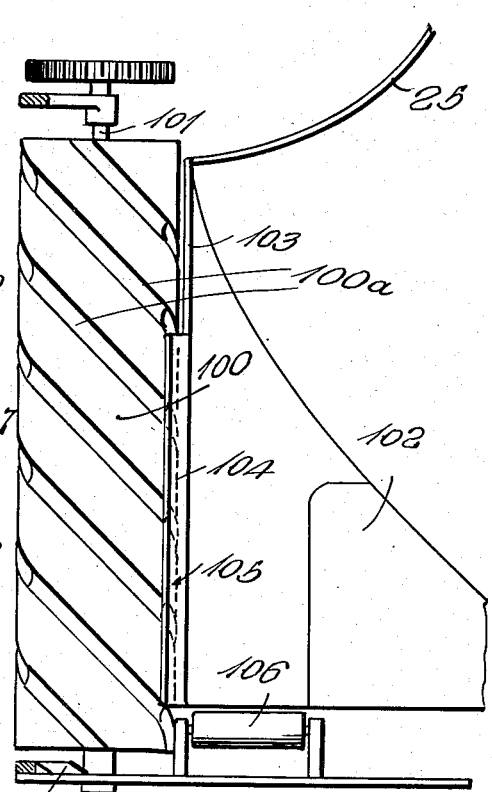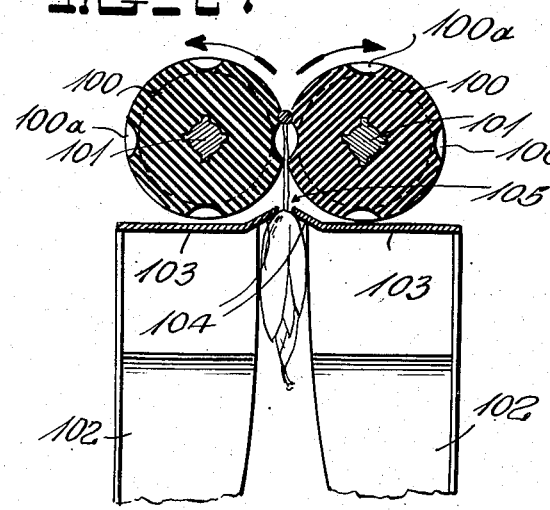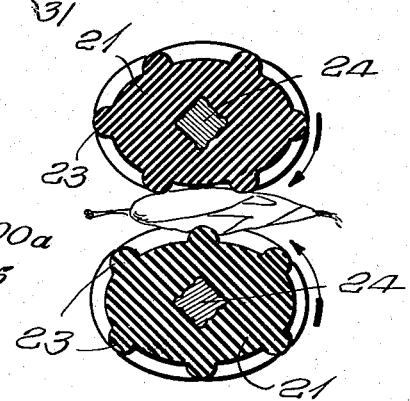

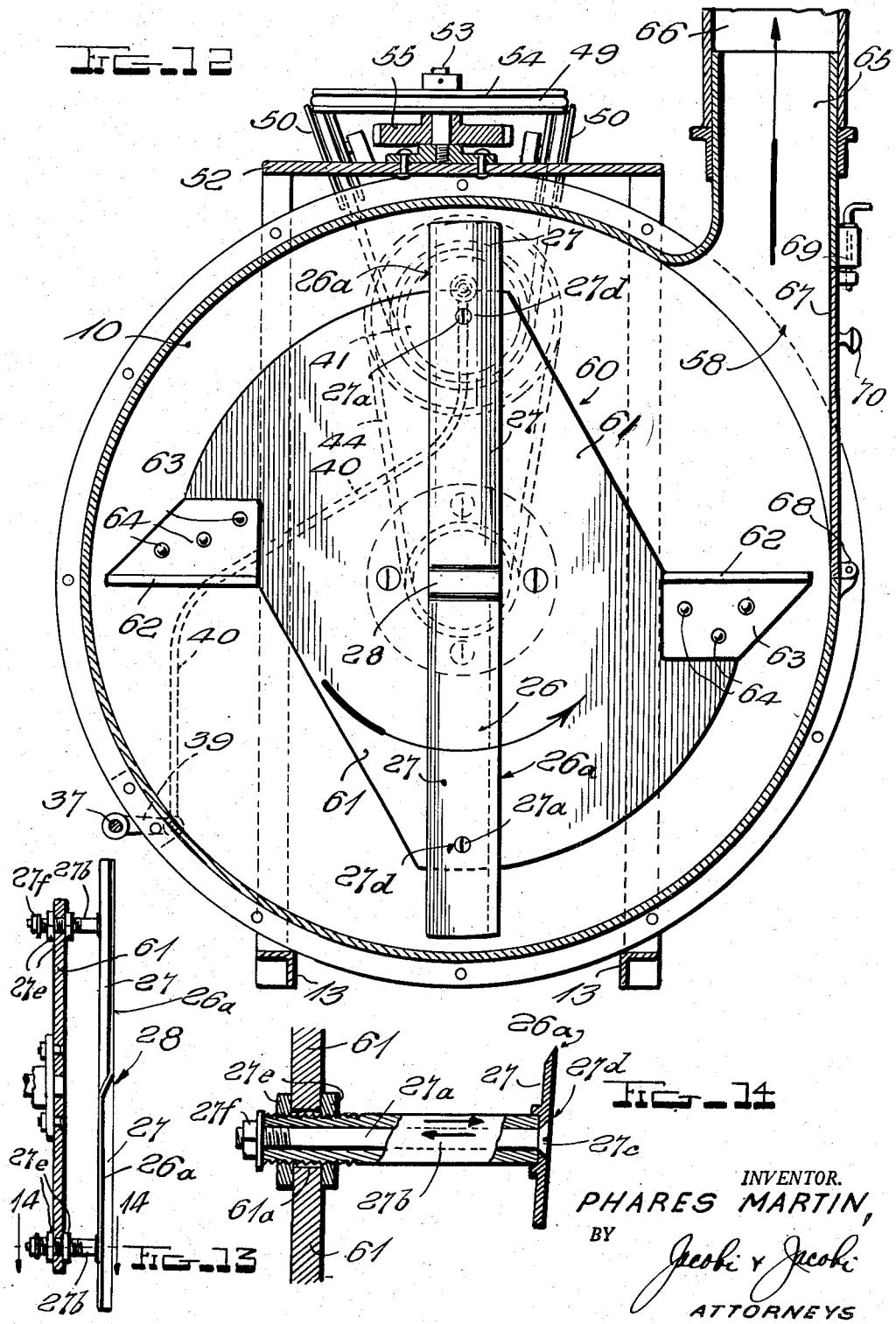

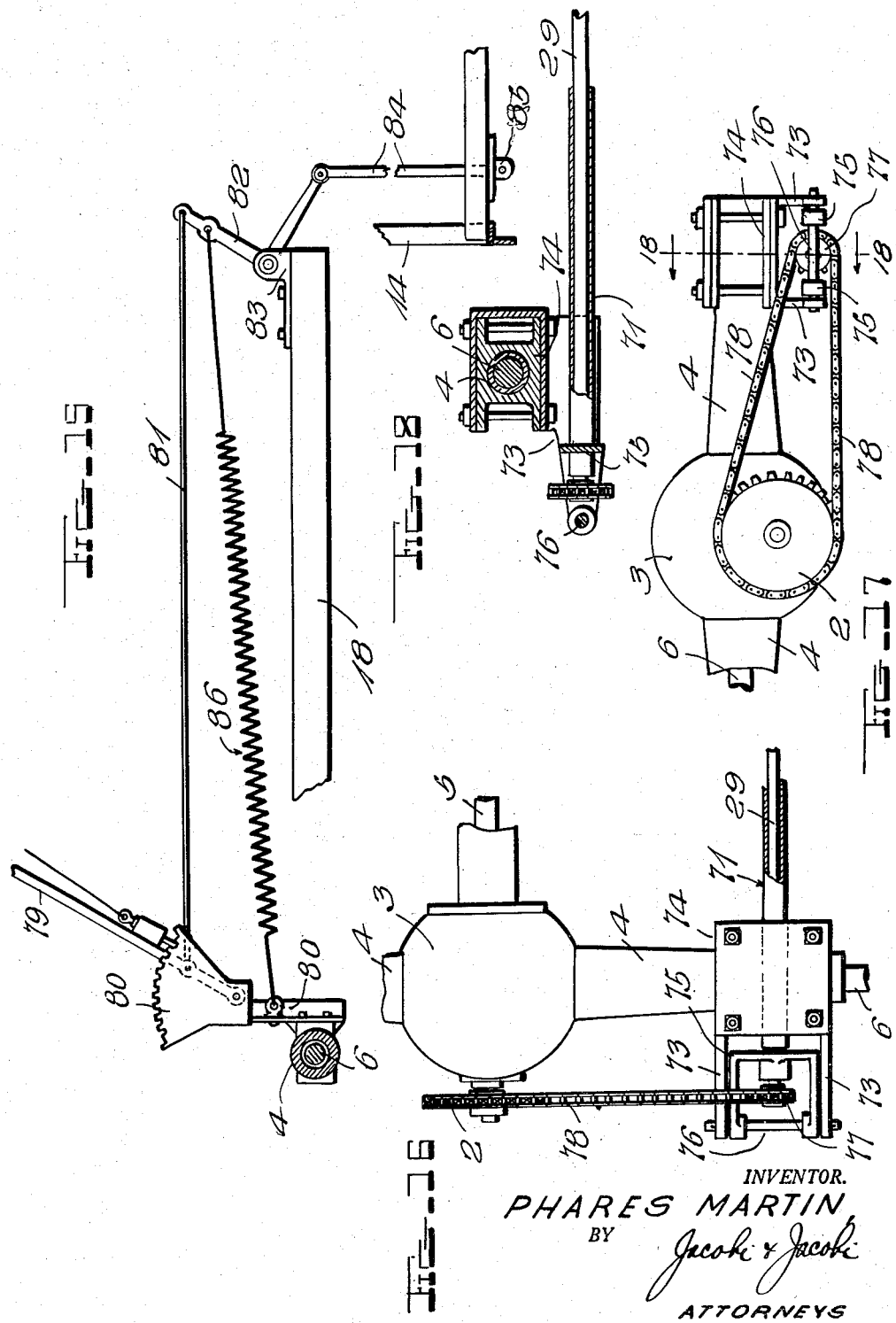

Nov. 3, 1953 P. MARTIN 2,657,513
CORN HARVESTER AND ENSILAGE CUTTER
Filed July 28, 1948 9 Sheets-Sheet 9
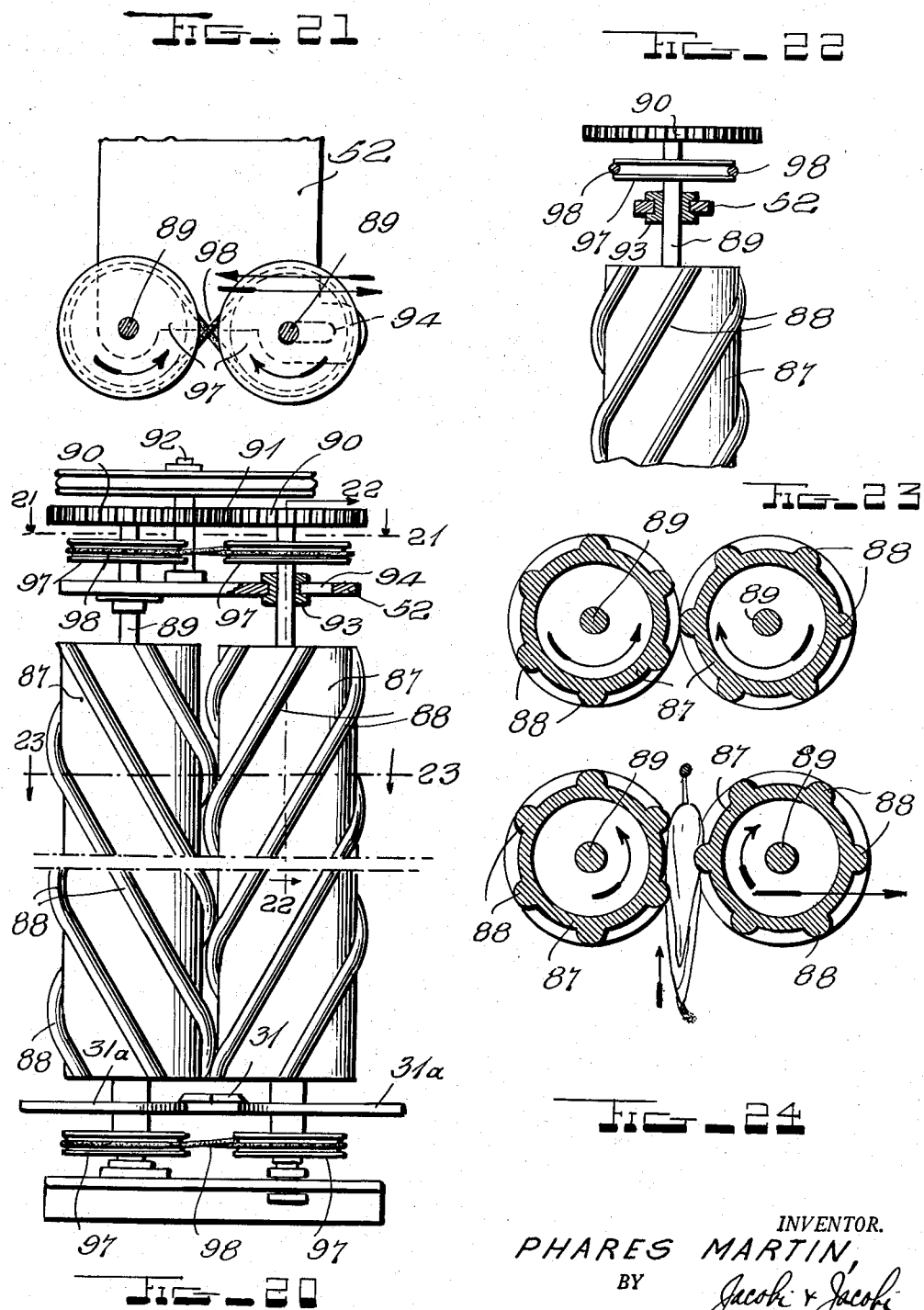
INVENTOR.
PHARES MARTIN,
BY Jacobi & Jacobi
ATTORNEYS

UNITED STATES PATENT OFFICE 2,657,513

CORN HARVESTER AND ENSILAGE CUTTER

Phares Martin, East Earl, Pa.

Application July 28, 1948, Serial No. 41,118

2 Claims. (Cl. 56—16)

This invention relates to an agricultural machine and more particularly to a combined harvester and ensilage cutter, it being the object of the invention to provide an implement of this character which may be mounted upon a tractor of conventional construction and moved along rows of growing corn and cause the corn stalks to be cut close to the ground and the stalks, after being cut, fed into a cutter and blower housing where they are subsequently cut into short lengths and discharged through an adjustable stack.

Another object of the invention is to provide a corn harvester and ensilage cutter wherein the growing corn moves between guides into engagement with rollers which urge the corn into a casing for engagement by the stalk severing blade and then into a casing wherein there is mounted a mechanism for cutting stalks into short lengths and then discharging the cuttings from the casing.

Another object of the invention is to provide a corn harvester and ensilage cutter having improved rollers for urging the cut stalks into a casing. The rollers are mounted in vertical position and being formed enternally with spirally arranged ribs arranged in such a manner that the ribs of one roller are disposed in staggered relation to the ribs of the other roller and thus cause the corn stalks to be firmly gripped as they are moved rearwardly between the rollers towards the inlet opening of the casing.

Another object of the invention is to so construct a machine that as the stalks are gripped by the rollers and cut by the stalk cutting blade they will be directed rearwardly by virtue of contact with the spiral ribs and thus the stalks are caused to enter the housing through a vertically extending inlet opening at the front thereof and at such an angle that a rapidly rotating knife within the housing will cut the incoming stalks diagonally.

Another object of the invention is to provide a machine with improved cutting blades mounted at the front of an impeller which also carries shoes for passing the small pieces of stalk upwardly towards a discharge spout as well as creating a powerful air blast within the casing thus causing the small pieces of stalk to be very effectively carried upwardly and outwardly through the discharge spout.

Another object of the invention is to provide a combined corn harvester and ensilage cutter wherein its vertically disposed rollers have rotary motion transmitted to them from a drive shaft which carries the ensilage cutting blade and in addition carries the impeller by means of which the cut pieces of corn stalk are discharged from the casing.

Another object of the invention is to provide a machine of this character wherein the blade for cutting growing corn close to the ground is actuated from a pulley mounted upon a shaft constituting a portion of the mechanism for transmitting rotary motion to the feed rollers and thereby cause the cutting blade and ensilage cutter and the impeller to be all driven from a common drive shaft and in properly timed relation to each other.

Another object of the invention is to provide a corn harvester and ensilage cutter of such construction that it may be mounted along one side of a tractor of conventional construction and rotary motion transmitted from the power take-off of the tractor to the main drive shaft of the harvester.

Another object of the invention is to provide a corn harvester and ensilage cutter with a frame so mounted that it may be shifted vertically in a guide disposed in an upright position at the front end of the tractor and thus allowing the apparatus to be shifted upwardly when it is necessary to move over obstructions in a corn field and also allow it to be readily transported from one place to another.

Another object of the invention is to provide a machine of this character wherein upward shifting of the frame is accomplished by means of a lever so mounted that it will be within easy reach of the driver of the tractor.

Another object of the invention is to provide a combined harvester and ensilage cutter of such construction that it may be mounted along one side of a tractor in such a position that the tractor may be driven across a corn field between rows of growing corn with the harvester in straddling relation to the rows of corn and thereby permitting the driver of the tractor to accurately steer the tractor and easily maintain the harvesting apparatus in position to follow the growing corn.

Another object of the invention is to provide improved rollers which are preferably formed of soft rubber and thus allowed to be distorted as stalks or ears of corn pass therebetween.

Another object of the invention is to provide a machine of this character wherein rollers may be formed of metal and one roller permitted to be forced away from the other when stalks bearing ears of corn are passing therebetween.

Another object of the invention is to provide a machine of this character so constructed that when stalks of corn bearing mature ears are being individually harvested, the ears may be detached from the stalks instead of being carried into the casing with the stalks, the latter only being cut into small pieces by the cutting mechanism within the housing.

With these and numerous other objects in view, my invention consists of the novel features of construction, combination and arrangement of parts as will be hereinafter referred to and more particularly pointed out in the specification and claims.

The invention is illustrated in the accompanying drawings wherein:

Fig. 1 is a side elevation showing the improved corn harvester and ensilage cutter applied to a tractor of conventional construction, the near wheel of the tractor being removed in order to clearly disclose the portions of the harvester which would be concealed thereby.

Fig. 2 is a view showing the harvester and a fragmentary portion of the tractor in top plan.

Fig. 3 is a side view on an enlarged scale, parts of the housing broken away and in section.

Fig. 4 is a horizontal sectional view with parts broken away taken substantially on line 4—4 of Fig. 3.

Fig. 5 is a sectional view taken on line 5—5 of Fig. 3.

Fig. 6 is a detailed horizontal sectional view on an enlarged scale taken on line 6—6 of Fig. 3 and showing more particularly the mounting of the case-hardened steel bars co-acting with the rotary cutter.

Fig. 7 is a top fragmentary plan view of Fig. 3 and illustrating more particularly the drive means for the rollers and associated parts.

Fig. 8 is a front elevation looking at the rollers and the casing containing the cutting mechanism and associated parts.

Fig. 9 is a top plan view of the rollers with the top portion of each being broken away and shown in section thereby illustrating the manner in which the rollers are distorted by an ear of corn passing between them.

Fig. 10 is a perspective view showing in diagram the manner in which rotary motion is transmitted to the rollers from the shaft carrying the ensilage cutting mechanism and associated parts.

Fig. 11 is a transverse vertical section taken along line 11—11 of Fig. 3 and showing more particularly the actuating mechanism for the stalk cutting knife.

Fig. 12 is a transverse vertical section of the device through the housing taken on line 12—12 of Fig. 4.

Fig. 13 is a fragmentary view on a reduced scale and with parts broken away illustrating the manner in which the cutter mounted within the housing is held in forwardly spaced relation to the impeller disc.

Fig. 14 is a horizontal section on an enlarged scale taken along line 14—14 of Fig. 13.

Fig. 15 is an enlarged fragmentary view illustrating the connection between the frame and the lever by which the harvester is to be lifted vertically to any desired height.

Fig. 16 is a top plan view on an enlarged scale illustrating the driving connection between the power takeoff of the tractor and the main drive shaft of the harvester.

Fig. 17 is a rear elevation of the mechanism for transmitting rotary motion from the power takeoff of the tractor to the power shaft of the harvester.

Fig. 18 is a longitudinal sectional view taken along line 18—18 of Fig. 17.

Fig. 19 is a fragmentary perspective view of the guide for the vertically shiftable frame of the harvester, this guide being welded to the tractor chassis.

Fig. 20 is a front elevation showing a modified arrangement of feed rollers and drive mechanism for the same.

Fig. 21 is a horizontal sectional view taken along line 21—21 of Fig. 20.

Fig. 22 is a fragmentary elevational view with parts broken away of one of the rollers shown in Fig. 20.

Fig. 23 is a sectional view taken transversely through Fig. 20 on the line 23—23 and showing the rollers in their normal position.

Fig. 24 is a similar view to Fig. 23 showing one of the rollers shifted away from the other by an ear of corn passing between the rollers.

Fig. 25 is a fragmentary front elevational view of the rolls in a further modification showing a structure permitting the harvesting of mature ears and then subsequently cutting up the stalks into ensilage.

Fig. 26 is a fragmentary central vertical sectional view of the modified structure shown in Figure 25.

Fig. 27 is a horizontal sectional view taken along line 27—27 of Fig. 25 and illustrating the manner in which the ears of corn are snapped from the stalks and the latter about to be fed towards the ensilage cutting blades contained within the housing.

This improved corn harvester and ensilage cutter constitutes an attachment for a tractor which is of a conventional construction and indicated by the numeral 1. The attachment is mounted along one side of the tractor and is driven from the power takeoff of the tractor which is also of conventional construction and includes a rotatary shaft carrying a gear 2 mounted at the back of the differential housing 3 of the tractor. Axle casings 4 project from opposite sides of the differential casing 3 and rotary motion is transmitted from the drive shaft 5 of the tractor to the rear axle 6 carrying wheels 7 by conventional differential gearing. The tractor also has the usual front wheel 8 which is mounted in a conventional manner and may be turned by means of the usual steering wheel 9 for guiding directional movement of the tractor. This is all conventional tractor construction and not illustrated in detail.

The casing or housing 10 of the improved harvester and ensilage cutter is formed of sheet metal and is preferably circular or drum-shaped when viewed in front or rear elevation, as shown in Figs. 8 and 12. This casing has its rear wall 11 firmly secured against the forward corner posts 12 of a frame 13 which extends rearwardly from the casing and said casing is shiftable vertically between guide bars 14 formed of angle iron. The frame 13 has a rear plate 15 formed with forwardly projecting flanges 16 along its opposite side edges which have face-to-face engagement with the angle iron guide bars 14 and the lower ends of the guide bars are connected by a cross bar 17 upon which the frame rests when in its lowermost position. Therefore, the guide is of a U-shaped construction, as shown in Fig. 19, and one of its side bars 14 is firmly secured to a chassis bar 18 of the tractor, as by welding.

Arms 19 project forwardly from the housing or casing 10 and constitute supports for gathering wings 20 which move along opposite sides of a row of growing corn during operation of the harvester and these wings serve to guide the corn stalks toward rollers 21 by means of which the corn stalks are fed into the casing 10 through an inlet 22 at the front of said casing. The inlet defined by a vertically extending oblong frame which is mounted through a slot formed vertically in the casing 10 substantially midway the width of its front wall, as best seen in Figs. 3 and 4, and since this inlet frame or mouth 22 is disposed rearwardly of the rollers 21, the cut stalks moving rearwardly between said rollers will be forced into the casing through this mouth. Preferably the rollers are formed of soft rubber, such as sponge rubber, and have formed thereon spirally extending ribs 23. The rollers are mounted on shafts 24 which extend vertically and are rotatably mounted at the upper and lower ends in bearings 24. It should be noted that the ribs of each roller are disposed in staggered relation to the ribs of the co-acting roller, as best shown in Figs. 4, 5 and 8.

A deflector plate 25 projects forwardly beyond upper ends of the rollers and will cause the upper portions of corn stalks to be bent backwardly as the harvester moves forwardly along a row of growing corn. This will cause the stalks of corn to be bowed longitudinally, and while the stalks are in this bent condition they will be gripped between the rollers. The fact that the ribs of the two rollers are in staggered relation to each other causes them to obtain a firm grip upon the corn stalks and as the severed stalks move inwardly through the mouth 22, they will be disposed diagonally instead of extending horizontally or vertically. In other words, the spiral ribs on the rollers, rotating in opposite directions, draw the gathered stalks inwardly and upwardly toward the mouth or opening 22 of the casing 10.

As the corn stalks are urged rearwardly through the mouth 22 into the casing, they are to be cut and thus reduced to small pieces which have diagonally cut ends due to the angle at which the stalks enter into the casing. This cutting of the stalks into small pieces is accomplished by means of a rotary cutting blade within the housing, hereinafter described.

During movement of the corn stalks towards the mouth they are to be severed close to the ground and in order so to do there has been provided a cutting blade 31 co-acting with stationary members 31a, as best seen in Fig. 5. This cutting blade 31 is carried by a sickle bar 32 which is slidably mounted for horizontal movement transversely of the rollers. The sickle bar 32 is mounted below the lower ends of the rollers, as best shown in Figs. 3 and 8 and slides through bearings 33 carried by portions of the arms 13 which project forwardly from the circular casing 10. At the one end of the reciprocating sickle bar 32 are formed upstanding ears 34 to which a link 35 is pivotally connected. This link is pivoted at its outer end to an arm 36 extending downwardly from the front end of a rocker shaft 37 which is rotatably mounted through bearings 38 carried by the housing or casing 10 below one side portion thereof. An arm 39 extends horizontally from the rear end of the shaft 37 back of the casing 10 and is pivoted to the lower end of a link or rod 40 which extends upwardly and then inwardly into the frame 13 and again upwardly, as best shown in dotted lines in Fig. 12, and has its upper end pivoted to a disc 41 in eccentric relation to the shaft 42. As shown in Fig. 3, the disc 41 is mounted at the front of a double pulley 43 carried by the shaft 42 and about this pulley are trained belts 44 which extend downwardly therefrom and are trained over a double pulley 45 mounted upon the drive shaft 29, as best seen in Figs. 3 and 11. It will thus be seen that as the shaft 29 rotates, rotary motion will be transmitted to the shaft 42 and rocking movement will be imparted to the rocker shaft 37 and its arm 35 caused to impart reciprocating movement to the sickle bar 32. The blade 31 will thus be reciprocated back and forth across the lower end of space between the rollers and corn stalks will be severed close to the ground as the harvester moves forwardly along a row of corn. Since the corn stalks are firmly gripped between the rollers, they will be fed into the casing 10 instead of dropping to the ground and after entering said casing the stalks will be cut into small pieces in a manner to be hereinafter and more particularly set forth.

The shaft 42 projects rearwardly from the frame 13 and its rear end is rotatably mounted in a bearing 46 carried by a bracket 47 which is secured to the rear plate 15 of the frame 13. About the rearwardly protruding end portion of the shaft 42 is mounted a pulley 48 and trained about this pulley is a belt 49, which has its flights extending upwardly from the pulley and engaged with idler pulleys 50 mounted in bearings 51 carried by a platform 52, as shown in Figs. 3 and 7. This platform is mounted horizontally upon the upper portion of the casing 10 and carries a bearing in which is mounted a vertical shaft 53. At its upper end the shaft 53 carries a large pulley 54 about which the forwardly extending portion of the belt 49 is trained so that the shaft 53 and a gear 55 carried thereby will be rotated from the shaft 42 at a reduced rate of speed. The gear 55 measures with a gear 56 mounted on the upper end of the shaft of one roller and this gear 56 measures with a corresponding gear 57 carried by the upper end portion of the co-acting roller. It will thus be seen that during operation of the harvester and ensilage cutter the rollers will be rotated in opposite directions and thereby cause the corn stalks to be griped and moved rearwardly the corn stalks to be gripped and moved rearwardly between the rollers at a relatively slow rate of speed. At the same time the cutting blade 31 will be reciprocated to sever the stalks close to the ground as they are forced inwardly through the mouth 22 into the casing to be acted upon by cutter mechanism therewithin, to be presently described.

Firmly secured to the forward end of the drive shaft 29, as best seen in Fig. 4, is an impeller 60 having a triple function. It acts as a fly-wheel, forms a support for cutting blades, and carries means thereon for creating a whirling air current to feed the cut stalks upwardly within the casing to a discharge opening.

This impeller comprises a heavy, flat blade 61 removably secured to the end of the shaft 29, as shown in Figs. 4 and 12, and at diametrically opposite points thereon are secured relatively wide shoes, or the like, 62. These shoes are formed from rectangular plates having on one face thereof the spaced longitudinal flanges 63 between which portions of the impeller 60 are fitted and secured through the medium of rivets 64. Thus, as the impeller is rotated within the casing 10, as best seen in Fig. 12, the shoes 62 will be caused to rotate in a circular path, causing a whirling air current to be created within said casing. Thus, these shoes 62, serving substantially as fan blades, will cause the stalks to be drawn into the casing 10 through the mouth 22 and after the stalks are cut, as hereinafter described, same will be moved upwardly and directed to a discharge opening.

For the purpose of inspecting the interior of the housing and adjusting of the cutting blades presently to be described, there is provided on the periphery of the housing, in line with the discharge spout, a door 67, pivotally mounted at its lower end by a hinge 68 and securely held in closed position by a latch 69, a handle 70 being also provided so it may be grasped and the door easily moved to an open or closed position.

Adjustably mounted on the front face of the impeller plate 61 is a cutting knife 26 which is elongated and twisted intermediate of its ends, as shown at Fig. 3. Opposite edges of this knife 26 are sharpened to form cutting edges 26a, so that as the knife is rotated with the impeller plate these cutting edges may effectively act on the corn stalks entering the mouth of the casing. The mountings for this knife 26 are adjacent the ends thereof and comprise bolts 27a, the heads 27c of which fit into recessed portions of the knife 26. Disposed between the knife 26 and the impeller plate 61 are the tubular portions 27b through which the bolts 27a project. Thus, these tubular portions constitute spacers for the knife with respect to the impeller plate and these tubular portions 27b are externally threaded at their innermost ends and projected through openings 61a formed in the plate 61. Threaded on the tube 27b, on opposite faces of the plate 61 are the adjusting nuts 27e and engaged with the threaded ends of the bolts 27a are the securing nuts 27f. Thus, it will be seen that this construction affords a means for securing the knife 26 in spaced relation to the plate 61 and through the medium of the nuts 27e, the spacing may be adjusted whereby relationship of the blade 26 to the mouth 22 of the casing may be adjusted. Hence, it will be appreciated that the cutting blade may be readily adjusted so that natural wear may be taken up and a reasonably close tolerance mintained between the stationary casehardened bars of the inlet throat or mouth 22 and the cutting edges 26a of the rotating blade 26. Whenever it is desired or necessary to make adjustments of this blade, same may be readily accomplished by simply opening the door 67 in the casing, as best shown in Fig. 12, whereby access to the blade for adjustment may be had.

It will further be noted, as also illustrated in Fig. 4, that the opening or mouth 22 of the casing 10 is directed somewhat to one side of the axial center of the casing and this offset is toward the side and in line with the outlet of said casing. Through the medium of this arrangement, it is assured that the cuttings of the stalks, effected through the action of the blade 26 will be directed upwardly by the shoes 62 of the impeller and caused to be fed to the discharge spout 65.

The shaft 29 is rotatably mounted through a stationary tubular casing 71 which extends longitudinally of the tractor and has its front end welded to a plate 72. The casing 71 is also formed with a plurality of fins 71a welded thereto and also secured to the plate 72 which plate in turn is secured to a plate 15 by bolts 72a.

The rear end portion of the tube 71, as shown in Figs. 16 and 18, passes through the arms 73 of a bracket 74 which is secured about the axle casing 4, and upon referring to Fig. 16, it will be seen that the rear end of the tube is secured in a yoke 75 which is U-shaped and has its arms engaged with the pivot pin or rod 76 carried upon the extremities of the arms 73. A gear 77 is carried by the end of the shaft 29 protruding from the tube 71 and about the gear 77 is trained a chain 78. The chain 78 extends towards the power takeoff of the tractor and is trained about the gear 2, so that when the tractor is in motion, rotary motion will be transmitted to the drive shaft 29. By having the tube 71 pivotally supported by the yoke 75, it is possible to tilt the shaft slightly and shift the frame 13 vertically in the guide 14 and thus allow the corn harvester to pass over any possible obstructions encountered in a field and also allow it to be shifted upwardly and held out of engagement with the ground when transporting the harvester from one place to another.

In order to effect vertical shifting of the frame 13, there has been provided a latch lever 79 which is pivotally mounted upon the tractor within easy reach of the driver, as best shown in Figs. 1 and 15, a rack or quadrant 80 being provided so that when the latch lever has been moved to raise the frame, it will be held in the adjusted position until it is desired to again lower the frame. A rod 81 extends forwardly from the latch lever longitudinally of the tractor and at its front end is pivoted to the upwardly extending arm of a bell crank lever 82. This bell crank lever is pivotally carried by a bracket 83 which is bolted to the chassis 4, and upon referring to Fig. 15, it will be seen that the lower arm of the bell crank lever projects forwardly from the chassis bar and is pivoted to the upper end of a rod 84. The rod 84 has its lower end pivotally connected with a rod or shaft 85 mounted transversely of the frame 13 and extending the full width thereof as shown in Fig. 11. The frame 13 fits reasonably snug between the vertically extending arms of the U-shaped guide 14 so that when upward pull is exerted upon the rod 85 to cause the frame to be shifted upwardly, binding will not take place between the frame and the guide. The corn harvesting and cutting mechanism is rather heavy (about 750 pounds) and in order to counterbalance its weight and allow it to be moved upwardly with ease by the driver of the tractor, there has been provided a strong coil spring 86 which extends longitudinally of the tractor and has its rear end anchored to the bracket 80a carrying the rack 80 and its front end connected with the upper arm of the bell crank lever 82.

It will thus be appreciated that the kinetic energy stored in the spring substantially counterbalances the weight of the harvester and relieves the driver to some extent of the physical effort necessary to run the harvester, as conditions encountered in the field may demand.

When this improved corn harvester and ensilage cutter is in use, it is mounted upon a tractor and extends along one side thereof with the frame 13 and the casing or housing disposed forwardly of the tractor. To enable the device to ride easily over the surface of the ground the skids 87 are mounted under the front ends of the forwardly extending arms 19, as best shown in Fig. 1.

It will be seen from the above description that as the tractor moves forwardly along a row of growing corn, the stalks are straddled by the wings or guides 20 and will be engaged between and gripped by the rubber rollers 21. As aforesaid, the deflector 25 tends to direct the stalks inwardly toward the rollers and as said stalks are engaged by the rollers the lower end portions thereof are severed by the reciprocating blade 31. In view of the spirally arranged ribs on the rollers, the stalks will be directed inwardly and upwardly toward the mouth 22 of the casing and upon entering the casing through the mouth thereof said stalks will be engaged by the rapidly rotating cutting edges of the blade carried on the impeller. Since the rollers 21 rotate at an appreciably lower rate of speed than does the rapidly rotating cutting knife, the timing of the rotation of these elements being pre-determined, these stalks will be cut into relatively short pieces and the cuttings will also be on diagonal planes. By providing the rollers of soft sponge rubber, it is apparent that same may accommodate themselves to the thickness of the corn stalks and allow, on occasion, for stalks with ears thereon to pass therebetween. In Fig. 9 of the drawings I have specifically illustrated the passage of a stalk with an ear of corn thereon passing between the sponge rubber rollers, the latter being shown distorted to accommodate the ear of corn.

After the stalks are cut in small pieces within the housing 10 through the medium of the rotating cutter, the same are directed by the whirling air currents to the discharge opening 65. Mounted on this discharge opening is an adjustable spout 66 which is arranged for the depositing of the cuttings to a wagon which may be brought alongside of the tractor or to any other device or apparatus for storage or use of said cuttings.

In Figs. 21 through 24 rollers of a modified construction have been illustrated. These rollers 87 correspond to the rollers 21 but are formed of metal instead of soft rubber and carry spirally extending ribs 88 corresponding to the ribs 23. The shafts 89 of these rollers carry gears 90, which correspond to the gears 56 and 57 of the previously described form, and one of these gears 90 meshes with a gear 91 corresponding to the gear 55, so that when the shaft 92 carrying the gear 91 is rotated, rotary motion will normally be transmitted to one roller 87. The second roller receives its rotary motion from the first roller and turns in an opposing direction. This arrangement of rollers is used when corn bearing a good many ears is being cut or may be merely used in case metal rollers are preferred instead of rubber rollers.

When an ear of corn is engaged between the rollers 87 extra space must be provided between the rollers to accommodate the ears of corn, as shown in Fig. 24. Therefore, the shaft for one roller is mounted in bearings 93 extending through slots 94 formed in the platform 52 of the frame and extending transversely thereof. By having the bearings 93 mounted in slots 94 the roller at the right, as shown in Fig. 20, will be shifted towards and away from the roller at the left of this figure. During such movement the gears 90 will be out of mesh with each other, and since rotary motion must at all times be imparted to the two rollers, the shafts 89 carry pulleys 97 which are located near upper and lower ends of the shafts and are connected by belts 98 formed of coiled springs or equivalent stretchable material. The belts are twisted between the pulleys so that their flights are in crossed relation to each other between the rollers thus causing the rollers to rotate in opposite directions.

Comparing Figs. 23 and 24, it will be seen that the rollers are normally disposed in close relation having the ribs thereof in staggered relation to each other. When corn stalks are gripped by the rollers they will be urged rearwardly by the rollers towards the casing. However, when ears of corn on the stalks are encountered, the thickness of the ears will cause the one roller to be moved away from the other, but the resilient belt will maintain the rollers in gripping engagement with the ears of corn. Action of the resilient belt also causes the rollers to be rotated at the same rate of speed and, therefore, when an ear of corn has passed between the rollers and the shiftable roller is drawn towards the other roller, the ribs will still be in staggered relation to each other.

In Figs. 25, 26 and 27, there is shown a further modified form of the invention, wherein means are provided for harvesting corn stalks with mature ears of corn thereon, the idea being to first snap the ears from the stalk and then to convey the stalks through rollers to the device for cutting the same.

In this form of the device, there are shown a pair of rollers 100 formed of soft sponge rubber, the periphery of which are grooved spirally, as shown at 100a, said rollers being mounted on the shafts 101. The rotation of the shafts and correspondingly the rollers is through the medium of gearing, as heretofore described in connection with other forms of the invention.

In this form of the invention the stalk gathering means or wings 102, as shown in Figs. 25 and 27, are provided at their inner ends with baffle plates 103, which at their inner opposed ends are bent angularly and rearwardly, as shown at 104 to form substantially a narrow throat 105. Thus, as the stalks bearing ears are directed between the wings 102, same are guided toward the throat 105, at which point the bent portions of the baffle plates 103 will constitute a stop and as the machine is moving forwardly the said ears will be snapped from the stalks and caused to drop downwardly. The stalks, however, may pass through the throat 105 on to the rollers 100 where they are gripped and urged rearwardly to the opening or mouth of the casing, as heretofore described in the other forms of the invention. Thus all ears which may be carried on the stalks contacted in this form of the invention, regardless of the position of the stalks with respect to the device, will be definitely removed from the stalks and drop downwardly before any stalk is permitted to enter the machine for cutting. After the ears have been snapped from the stalks, the same may drop to the ground where the same may be gathered by a special crew or the ears may drop upon appropriate conveyors 106 where they may be conveyed to suitable bins or the like. It is, of course, understood that any conventional mechanical means may be provided for imparting movement to these conveyors and likewise any conventional type of conveyor may be utilized. Furthermore, in this form of the invention, while it has not been fully disclosed, it is understood that the same type of stalk cutting device is utilized, as described in the other forms of the invention.

From the foregoing description of the construction of my improved device, the operation thereof and the method of assembly will be readily understood. It will be seen also that the complete harvester and ensilage cutter may be produced and offered to the public as a unit for ready adaptation to any type of tractor, since the necessary means for adaptation are well within the abilities and facilities of substantially all farmers.

While I have particularly described the elements best adapted to perform the various functions set forth, it is apparent that various changes in form, proportion and in the minor details of construction may be resorted to without departing from the spirit or sacrificing any of the principles of the invention.

Having thus described the invention, what is claimed is:

1. For mounting on a vehicle having power takeoff means, a harvesting and ensilage cutting apparatus comprising in combination stalk cutting means disposed slightly above ground level, vertically disposed substantially parallel feeding rolls mounted in advance of said cutting means, spirally arranged intermeshing ribs on said rolls, a forwardly extending deflector plate disposed above and in advance of said rolls, a substantially cylindrical casing having front and rear walls disposed rearwardly of said cutting means with the axis of said casing substantially at right angles to the axes of said rolls, a centrifugal impeller mounted for rotation within said casing, a diametrically disposed knife blade carried by said impeller within said casing in close proximity to the front wall of said casing, the length of said knife being slightly less than the internal diameter of said casing, said knife being provided with oppositely directed cutting edges on each side of the rotational axis thereof, said casing being provided with a vertically disposed relatively narrow inlet slot in the front wall thereof, said casing being provided with a discharge opening and drive means for connecting said power take-off and said impeller, said cutting means and said rolls to drive the same whereby upon forward movement of said apparatus the upper portion of a growing stalk will first be engaged by said deflector plate to bend said stalk forwardly away from said rolls the lower portion of said stalk passing between the intermeshing ribs on said rolls adjacent the lower ends thereof, said stalk being severed below said rolls by said cuting means, rotation of said rolls serving to move the lower end of said stalk upwardly and rearwardly through said inlet slot and into the path of movement of said knife at an angle to the plane thereof to cut said stalk into relatively small pieces, said pieces being discharged from said casing through said discharge opening by the action of said impeller, continued rotation of said rolls serving to move said stalk upwardly and rearwardly in said inlet slot to utilize substantially the entire length of said knife.

2. A harvesting and ensilage cutting apparatus as defined in claim 1 in which said inlet slot is offset horizontally to one side of the rotational axis of said knife.

PHARES MARTIN.

References Cited in the file of this patent
UNITED STATES PATENTS

| Number | Name | Date |
|---|---|---|
| 891,299 | Smith et al. | June 29, 1908 |
| 1,241,325 | Angus | Sept. 25, 1917 |
| 1,357,145 | Byrd | Oct. 26, 1920 |
| 1,832,094 | Campbell | Nov. 17, 1931 |
| 2,115,234 | Preston | Apr. 26, 1938 |
| 2,183,769 | Hawkins | Dec. 19, 1939 |
| 2,188,522 | Alfs | Jan. 30, 1940 |
| 2,253,794 | Lindholm | Aug. 26, 1941 |
| 2,333,901 | Swenson | Nov. 9, 1943 |
| 2,416,123 | Siemen | Feb. 18, 1947 |